United States Patent
Sell

(10) Patent No.: US 7,023,445 B1
(45) Date of Patent: Apr. 4, 2006

(54) CPU AND GRAPHICS UNIT WITH SHARED CACHE

(75) Inventor: John V. Sell, Los Altos Hills, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 10/822,506

(22) Filed: Apr. 12, 2004

(51) Int. Cl.
G09G 5/36 (2006.01)

(52) U.S. Cl. ............ 345/557; 345/543; 345/537; 711/122; 711/130

(58) Field of Classification Search .......... 345/422, 345/542, 501, 544, 558, 582, 421, 557, 506, 345/606, 541, 552; 711/133, 122, 118, 134, 711/130, 128, 141, 119
See application file for complete search history.

(56) References Cited

U.S. PATENT DOCUMENTS

| | | | |
|---|---|---|---|
| 5,949,423 A | 9/1999 | Olsen | |
| 6,226,012 B1 | 5/2001 | Priem et al. | |
| 6,239,808 B1 | 5/2001 | Kirk et al. | |
| 6,266,064 B1 | 7/2001 | Snyder | |
| 6,681,297 B1 * | 1/2004 | Chauvel et al. | 711/130 |
| 6,801,207 B1 * | 10/2004 | Tischler et al. | 345/557 |
| 6,801,208 B1 * | 10/2004 | Keshava et al. | 345/557 |
| 6,819,321 B1 * | 11/2004 | Hsieh et al. | 345/506 |
| 6,825,848 B1 * | 11/2004 | Fu et al. | 345/557 |
| 6,842,180 B1 * | 1/2005 | Maiyuran et al. | 345/541 |
| 6,891,543 B1 * | 5/2005 | Wyatt | 345/541 |

OTHER PUBLICATIONS

Thomas Pabst, "High-Tech and Vertex Juggling—NVIDIA's New GeForce3 GPU," Feb. 27, 2001, 16 pages.
Alekey Berillo, "S3TC and FXT1 Texture Compression," Copyright by Digit-Life.com, 1997-2003, 21 pages.
"Geode™ GX1 Processor Series Low Power Integrated x86 Solution," National Semiconductor Corporation, Jun. 2002, 246 pages.
Ned Greene, Michael Kass, Gavin Miller, "Hierarchical Z-Buffer Visibility," Siggraph Conference Proceedings, Aug. 1993.

* cited by examiner

Primary Examiner—Ulka J. Chauhan
Assistant Examiner—Dalip K. Singh
(74) Attorney, Agent, or Firm—Meyertons Hood Kivlin Kowert & Goetzel, P.C.; Rory D. Rankin

(57) ABSTRACT

A method and mechanism for managing graphics data. A graphics unit is coupled to share a cache and a memory with a processor. The graphics unit is configured to partition rendered images into a plurality of subset areas. During the rendering of an image, data corresponding to subset areas of an image which require a relatively high number of accesses is deemed cacheable for a subsequent rendering. During a subsequent image rendering, if the graphics unit is required to evict data from a local buffer, the evicted data is only stored in the shared cache if a prior rendering indicated that the corresponding data is cacheable.

23 Claims, 5 Drawing Sheets

CPU AND GRAPHICS UNIT WITH SHARED CACHE

BACKGROUND OF THE INVENTION

1. Field of the Invention

This invention is related to the field of computer systems and, more particularly, to management of graphics data in computer systems.

2. Description of the Related Art

Computer systems may include multiple processing units which share one or more memory devices for storage of data. One example of such a system includes both a central processing unit (CPU) and a graphics unit (graphics unit) which share access to a common memory device in what may be referred to as a unified memory architecture (UMA). In such a system, the shared memory device may be used for storing graphics data for use by the graphics unit, as well as instructions and data for use by the CPU.

As is well known, computing systems frequently utilize one or more caches in order to reduce latencies due to memory accesses. CPU's are commonly configured to take advantage of caches in order to improve performance. Similarly, like a CPU, a graphics unit may also benefit from the caching of data. Therefore, systems may be designed which allow a graphics unit to share the CPU's cache. However, allowing a graphics unit to share a cache with the CPU may create a number of problems.

Generally speaking, the memory bandwidth requirements for a graphics unit may be significantly larger than that required for the CPU. For example, the storage required for an image which is being rendered may be as large as 24 MB (or larger) which is exceeds the size of a typical CPU cache. In addition, the memory bandwidth required by the rendering process may be 3 to 4 times the bandwidth required by the CPU to perform its activities related to the application. Consequently, were the graphics unit and CPU to simply share a cache, the graphics unit data would overwhelm the CPU data and CPU performance would be severely impacted.

In view of the above problems, a method and mechanism are desired which allow a CPU and graphics unit to share a cache in a manner which does not seriously impair the performance of the CPU and which may reduce memory bandwidth requirements.

SUMMARY OF THE INVENTION

A method and mechanism for managing graphics data in a shared memory system are contemplated. In one embodiment, a graphics unit is coupled to share both a cache and a main memory with a processor. The graphics unit includes a relatively small cache configured to store graphics data for use during the rendering process. Images which are to be rendered are partitioned into a plurality of subset areas. During the rendering of an image, data activity associated with each of the subset areas is monitored. In one embodiment, the number of evictions from the small graphics unit cache corresponding to each of the subset areas is tracked and recorded. Subsequent to rendering the image, those subset areas which showed higher levels of data activity are predicted likely to have high levels of activity again and are deemed cacheable. During a subsequent image rendering, if the graphics unit is required to evict data from the small, local cache, the evicted data is stored in the shared cache if the prior rendering indicated the data being evicted is cacheable. If the graphics unit does not indicate the data being evicted is cacheable, the evicted data is stored in memory without being stored in the shared cache.

In one embodiment, the graphics unit is configurable to store a threshold indicator. In response to determining the number of evictions corresponding to a subset area during an image rendering exceeds the threshold, the graphics unit is configured to indicate that the corresponding subset area corresponds to cacheable data. In an alternative embodiment, subset areas are deemed cacheable based on the relative levels of activity among the subset areas of a given image. In one embodiment, the counts for each subset area indicate themselves whether the corresponding subset area is cacheable. Alternative embodiments include a separate flag to indicate whether a subset area is cacheable.

BRIEF DESCRIPTION OF THE DRAWINGS

The following detailed description makes reference to the accompanying drawings, which are now briefly described.

Figure 1:
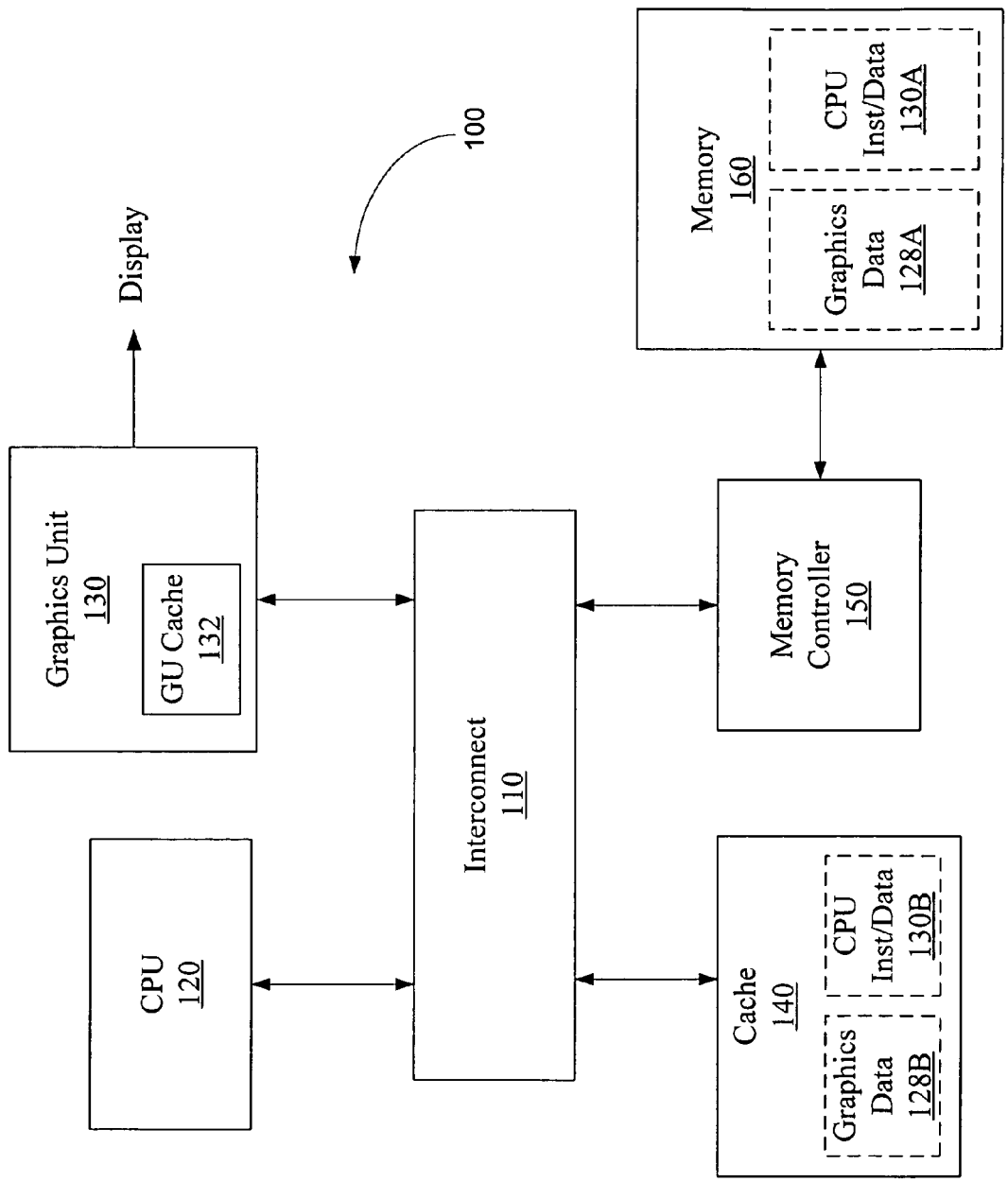
FIG. 1 is a block diagram illustrating one embodiment of a processing apparatus.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIG. 1, one embodiment of a portion of a computing system 100 is shown. In the illustrated embodiment, the computing system 100 includes at least one processor (CPU) 120, an external cache 140, a memory 160, and a graphics engine 130. In the embodiment shown, the processor 120, cache 140, memory 160, and graphics engine 130 are coupled via an interconnect 110. Also illustrated in FIG. 1 is a memory controller 150 coupled between interconnect 110 and memory 160. It is noted that one or more of the components illustrated in FIG. 1, including memory controller 150, may be integrated into a single device. Those skilled in the art will appreciate various options for configuring the components are possible. In one embodiment, the illustrated computing system 100 may represent a desktop, or laptop, computer. However, it is noted that the methods and mechanisms described herein may find application in television coupled gaming consoles, handheld devices, television set-top boxes, or otherwise.

Generally speaking, the graphics engine 130 includes circuitry configured to convey a graphical image (represented by graphics data stored in the computer system 100) for display. Various embodiments may include display devices such as cathode ray tubes (CRT), liquid crystal displays (LCD), plasma displays, optical semiconductor displays, or any other suitable display device. In other embodiments, computing system 100 may comprise a projector configured to project images onto a separate screen or device. Numerous such alternatives are possible and are contemplated.

In some embodiments, the graphics engine 130 may further include circuitry used to prepare (or render) the graphical image. Often the graphics data may be stored as one or more frame buffers that represents the image to be displayed as a set of pixels. Each pixel may be represented in the data forming the frame buffer. For example, 4 bytes of data per pixel may be used (one byte for each of red, green, and blue and one byte of alpha). Other embodiments may use more or fewer bytes (or bits) to represent a pixel. The graphics engine 130 may read the frame buffer and interpret the pixel data in order to display each pixel on the display.

The graphics engine 130 may receive commands (e.g. from software executing on the processor 120) to draw various shapes into the image. In response to these commands, the graphics engine 130 may prepare a new frame buffer for display. Consequently, the graphics engine 130 may generate both reads (to obtain graphics data to modify) and writes (to store the modified graphics data).

In a UMA system such as that shown in FIG. 1, the graphics data used by the graphics engine 130 may be stored in memory 160 and the graphics engine 130 may perform reads and writes to memory 160 via interconnect 110. In addition to being stored in memory 160, graphics data may also be cached in cache 140. Therefore, reads may access the cache 140 for the corresponding data and may read the data from the cache 140 if a hit is detected. In some embodiments, the cache 140, the processor 120, and the interconnect 110 may be integrated onto the same integrated circuit while the memory 160 may not be integrated. In some embodiments, the graphics engine 130 may also be integrated on the same integrated circuit as the processor 120, the cache 140, and interconnect 110. Numerous alternative configurations are possible.

Generally speaking, a frame buffer may comprise a relatively large amount of data. For example, in an embodiment with a screen resolution of 1024×768 pixels, where each pixel is represented by four bytes, the frame buffer may be on the order of 2–3 megabytes in size. Additional graphics related data may also be present, such as a depth buffer similar in size to the frame buffer and anti-aliasing data related to the frame buffer. As may be appreciated, processor instructions and data may be stored in cache 140 (e.g., an L2 cache) in order to reduce the access latencies associated with accesses to memory 160. Consequently, storing the entire frame buffer in the cache 140 may displace processor instructions and/or data and thereby adversely impact processor 120 performance. In some cases, the size of the frame buffer may exceed the size of the L2 cache 14 and thus storing the entire frame buffer in the cache 140 may not be possible.

Also illustrated in FIG. 1, graphics unit 130 includes a graphics unit (graphics unit) cache 132 configured to store graphics data. However, generally speaking the graphics unit cache 132 may be relatively small as compared to cache 140. As used herein, "graphics data" may include any data that represents an image (or portion thereof) to be displayed on a computer display device. For example, a frame buffer or portion thereof may comprise graphics data. Additionally, as mentioned above, various other data may be included in graphics data (e.g. depth data, anti-aliasing data, texture maps, blending data, masking data, and any other data deemed suitable for a given system.).

Processor 120 may generally include circuitry to execute instructions defined in an instruction set architecture implemented by the processor 120. For example, in one embodiment, the processor 120 may implement the x86 instruction set (also known as IA-32). Other embodiments may implement any instruction set architecture (e.g. the 64 bit extension to the x86 instruction set from Advanced Micro Devices, Inc., the PowerPC instruction set architecture, the ARM instruction set architecture, the MIPS instruction set architecture, etc.). Alternatively, the processor 120 may implement a custom instruction set intended for a particular purpose, such as a gaming console. Processor 120 may also implement one or more level 1 (L1) caches, and thus cache 140 may be referred to as a level 2 (L2) cache. In other embodiments, cache 140 may be a lower level cache (e.g. L3, L4, etc.) or may itself be an L1 cache if the processor 120 does not implement caches. In still other embodiments, cache 140 may be some form of memory buffer (e.g. a random access memory (RAM)).

Cache 140 may include a high speed cache memory of any desirable configuration (e.g. set associative, direct-mapped, fully associative, etc.). Generally speaking, the cache 140 may be interrogated (checked for a hit) for processor accesses (i.e. reads and writes) or graphics engine 130 accesses.

The interconnect 110 may comprise any type of communication medium (e.g. one or more buses, point-to-point interconnect, crossbar, etc.). Interconnect 110 may also include various circuitry in various embodiments (e.g. a bridge between the processor 120, the cache 140, the memory 160, and the graphics engine 130). The interconnect 110 may, in some embodiments, be a standard interconnect such as HyperTransport™, Peripheral Component Interconnect (PCI), PCI Express, etc. The memory 160 may include any type of memory, but may preferably include dynamic random access memory (DRAM) such a synchronous DRAM (SDRAM), particularly double data rate (DDR) SDRAM.

Generally speaking, a three-dimensional scene that a graphics application wishes to display or print is composed of a number of objects. Such objects may include sky, clouds, trees, grass, people, animals, cars, roadway, etc. A typical rendering process transforms the objects from coordinate systems in which they were defined to a common coordinate system for the three dimensional world being modeled. During this process, lighting, reflections, shadows and other effects are determined. Subsequently, the objects are transformed so that they are properly oriented relative to the intended viewer of the image, and projected with appropriate perspective onto a two dimensional plane such as the face of a computer display. Projected images are generally divided into a two-dimensional array of small, equal size areas or pixels. Images intended for computer monitor display commonly range from 1024×768 pixels to 2048×1536 pixels.

When objects are transformed and projected onto the display, they may be thought of as consisting of a set of pixels matching the display pixels that they may affect. These objects may not affect some or any of these pixels because some objects will be behind other objects from the viewer's perspective and will be partially or wholly occluded. For efficiency some objects may not be modeled as being fully three-dimensional. That is, they may not have a backside relative to the viewer. In contrast, fully three-dimensional objects have pixels that face away from the viewer. These pixels which face away from the viewer don't affect the final image and are not generally considered for rendering. There are typically three or more times as many forward facing pixels considered for rendering as there are in the final image.

The order in which objects should be rendered is implicit in the order that the application presents them for rendering. The implied order is often required to achieve special effects such as translucency or reflections. Depth values are maintained for the pixels in an image in the process of being rendered. These depth values are typically used to determine if pixels that might be affected by an object being rendered are in fact affected. A pixel in the image being rendered may be modified once or multiple times depending on how many objects may affect the pixel and the order in which the objects are rendered.

Frequently, three or more times as many pixels are considered for rendering as may actually exist in the image being created. However, activity across the pixels in an image is very unlikely to be evenly distributed. Usually a majority of the pixels in the image are only considered and rendered once. Many of the rest are considered twice and rendered once or twice. Finally, while a relatively small number are considered more often, they may account for a majority of the rendering activity.

The principal types of data accessed by the graphics unit as part of the image rendering process are the image being rendered or "rendering frame buffer", depth information for the image being rendered or "depth buffer", texture, and object description and commands. A common form of object description and commands are a set of vertices comprising a triangle mesh forming the surface of the object, and a rendering list indicating which vertices form each triangle and other commands to the graphics unit. Textures are typically two-dimensional arrays that are mapped to the object surface. They can provide color, position and normal modification and other per pixel information in addition to information derived from the vertices and other sources. Rendering frame buffer and depth buffer data are read and written by the graphics unit and together they commonly represent as much as 75% of the graphics unit bandwidth. The other types of data are normally only read by the graphics unit.

In one embodiment, the probability that specific data will be accessed by the graphics unit during the creation of an image is predicted. Based upon these predictions, decisions may be made as to which graphics unit data may be stored in a cache which is shared with the CPU. Generally speaking, data which is likely to be accessed multiple times during the creation of an image may be stored in the shared cache. On the other hand, data which is predicted to be accessed less frequently is not placed in the shared cache. In this manner, the negative effects of sharing the cache with the CPU may be reduced, and the efficiency of the graphic unit's use of the shared cache may be improved.

Figure 2:
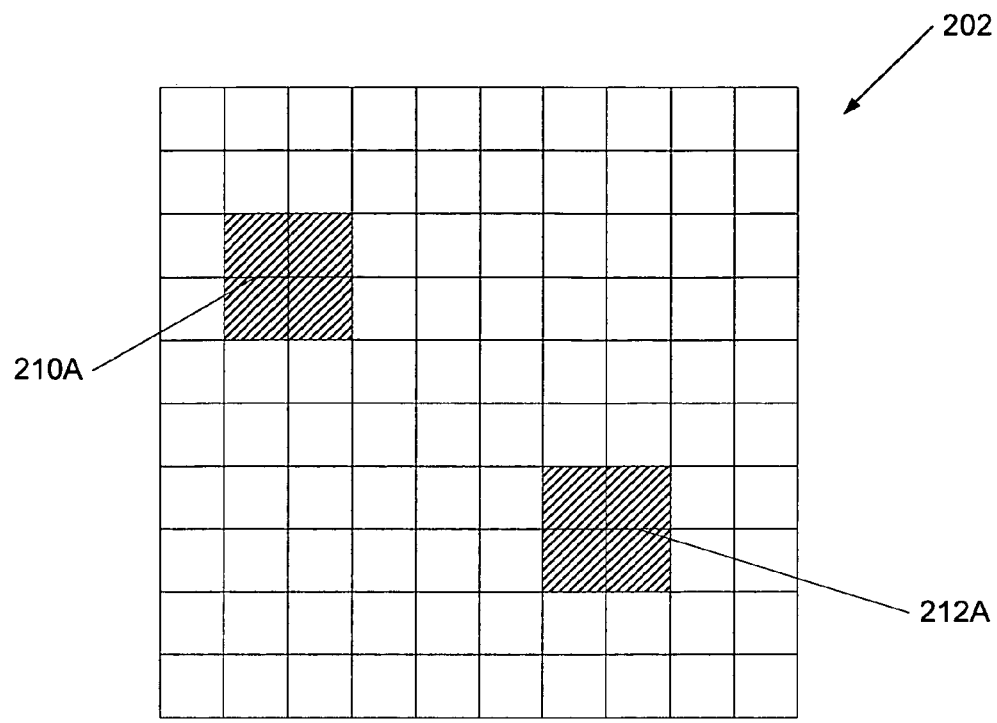
FIG. 2 depicts one embodiment illustrating the partitioning of a rendering image/display.
Figure 2:
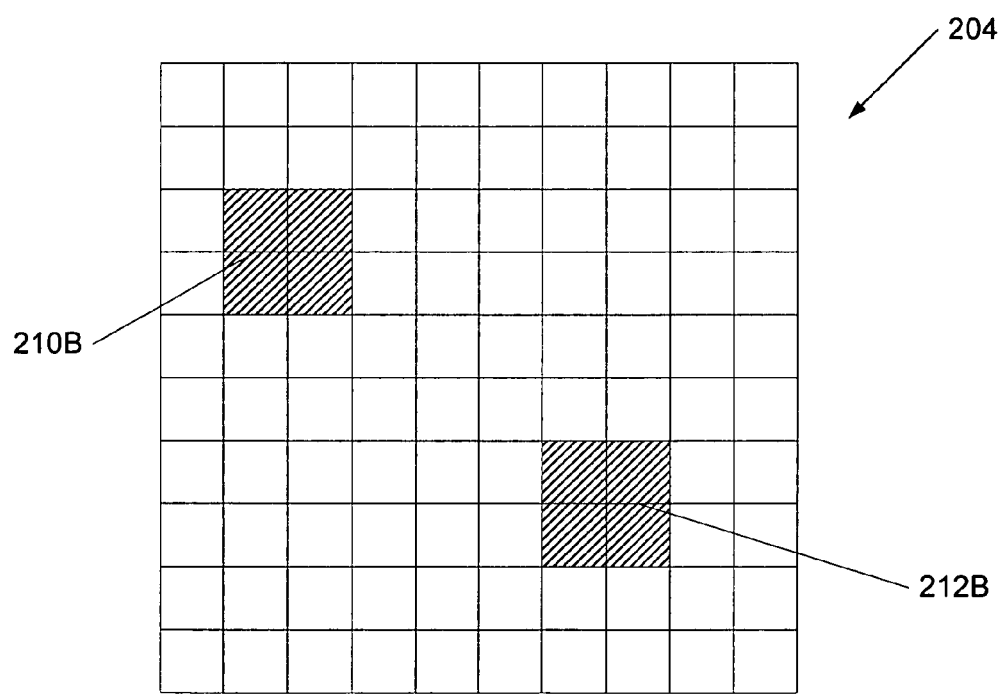

Turning now to FIG. 2, an example is provided which illustrates how a prediction mechanism may be utilized to more efficiently utilize a shared cache as described above. In the example of FIG. 2, a display 202 upon which an image is rendered is shown. Display 202 represents a previously rendered image and display 204 represents an image currently being rendered. Display 202 illustrates the image is divided into a number of subset areas or "blocks". For purposes of discussion, each block depicted may correspond to one or more pixels. In one embodiment, display/image 202 may generally correspond to a rendering frame buffer. Those skilled in the art will appreciate that a depth (or "Z") buffer is generally used in the rendering process as well. As the rendering buffer data and depth buffer data typically have directly corresponding areas, the method and mechanism described herein may be applied to corresponding depth buffer subset areas as well. In addition, the method and mechanism may be applied to anti-aliasing data as well which is generally linked to the frame buffer data.

Generally speaking, activity corresponding to each of these blocks may be tracked and used for purposes of predicting how often rendering frame buffer and depth buffer data are accessed. For example, data on the number of pixels considered for rendering in each subset area of the image may be tracked and those areas in which the number of pixels considered are relatively high may be designated as corresponding to cacheable data. On the other hand, if a block corresponds to an area in which the number of pixels considered for rendering is relatively low, that block may be designated as corresponding to non-cacheable data. Subsequently, when rendering an image, these determinations regarding whether an area corresponds to cacheable or non-cacheable data may be used to decide whether data may be cached.

For example, image/display 202 in FIG. 2 represents a previously rendered image. During the rendering of this image 202, data activity corresponding to each of the blocks was tracked. This tracking indicated that the blocks within subset area 210A and 212A correspond to blocks in which the number of pixels considered for rendering the area was high as compared to the other areas. Consequently, an indication is stored (e.g., in the Graphics Unit) for each of the areas or blocks which indicates these blocks correspond to cacheable data. Subsequently, when rendering image 204, data which corresponds to these areas (210B and 212B in the image being rendered) which is evicted from the Graphics Unit may be stored in a shared cache. Data which does not correspond to these "cacheable" areas may be written to memory without being stored in the shared cache. Because the previous rendering required multiple accesses to data for these "cacheable" areas, a prediction is made that these areas are more likely to require multiple data accesses than other areas. By giving caching preference to these "predicted" areas, cache use may be made more efficient.

Figure 3:
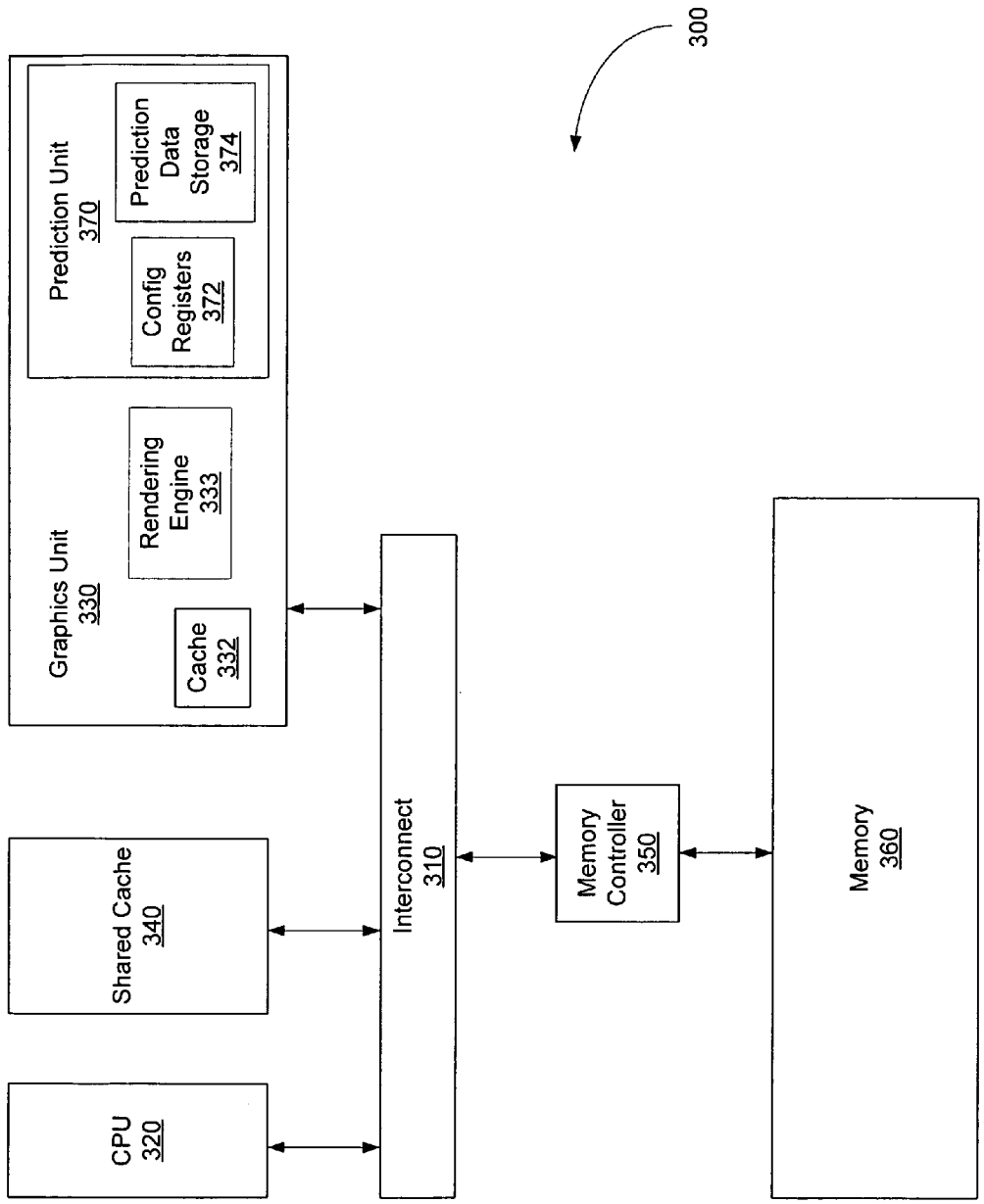
FIG. 3 is a block diagram illustrating one embodiment of a processing apparatus including a graphics unit.

FIG. 3 depicts an overview of one embodiment of a system with a graphics unit configured to share a cache with a CPU. In the embodiment shown, a CPU 320, shared cache 340, a graphics unit 330, and a shared memory 360 are illustrated. FIG. 3 depicts the memory 360 as being coupled to an interconnect 310 via memory controller 350. In addition, each of the CPU 320, shared cache 340, and graphics unit 330 are coupled to interconnect 310. Those skilled in the art will appreciate numerous other configurations of the components depicted in FIG. 3 are possible and all such other configurations are contemplated as well.

Generally speaking, the shared cache 340 is divided into subunits. In one embodiment the shared cache 340 is divided into lines with each line being configured to hold a small portion of main memory 360 contents aligned on line sized boundaries. Where the main memory 360 size may be 256, 512, 1024, 2048, or more megabytes, a typical line size may, for example, include only 64 bytes. In addition, the graphics unit 330 generally contains local data buffers or small caches that can hold a small portion of the rendering frame buffer and the depth buffer data. In the example shown, these buffers are depicted by cache 332. These buffers or caches may typically be able to hold at least one and usually a number of CPU cache line sized areas of the rendering frame buffer and of the depth buffer.

Rendering frame buffer and depth buffer data is brought into the local graphics unit 330 storage from either the shared cache 340 or main memory 360 if not already present in the graphics unit 330 when it is accessed by the graphics unit 330. As the size of the local storage 332 in the graphics unit 330 may be relatively small, new data brought into the graphics unit 330 may frequently cause the eviction of data currently stored in graphics unit cache 332. It is also noted that data created by the graphics unit (e.g., frame or depth data) may also cause the eviction of data currently stored in graphics unit cache 332. Data which is evicted from the graphics unit cache 332 may or may not be stored in the shared cache 340 depending on determinations made by the graphics unit 330. In one embodiment, if the prediction unit 370 indicates the evicted data is likely to be accessed again during the rendering of the current image, the evicted data may be cached in the shared cache 340. On the other hand, if the prediction unit 370 indicates there is a lower probability the evicted data will be accessed again during the current rendering, modified data that is evicted may be stored in main memory 360 without being stored in shared cache 340, and unmodified data may simply be discarded.

In one embodiment, the graphics unit 330 includes a mechanism configured to track the amount of data considered for rendering in each subset area of the image being rendered. In the example of FIG. 3, the graphics unit 330 includes a rendering unit 333, and a prediction unit 370 which is configured to track the number of pixels considered for rendering in each subset area of the image being rendered. In addition to tracking the number of pixels considered, the graphics unit 330 may contain an additional mechanism that indicates in which subset areas in the previously rendered image the number of pixels considered for rendering was relatively large.

As shown in FIG. 3, prediction unit 370 includes configuration registers 372 and prediction data 374. In one embodiment, prediction unit 370 is configured to store in prediction data storage 374 an indication corresponding to each subset area of an image being rendered. During the rendering of an image, when data corresponding to a particular subset area is considered, an indication is stored in a corresponding location in prediction data storage 374. For example, in one embodiment the indication stored for each subset area in storage 374 may be a counter which is incremented each time data corresponding to the area is considered. Upon completion of an image rendering, an indication is then stored for each subset area which indicates the relative amount of data considered with respect to the other subset areas.

For example, if pixel data corresponding to a particular area was considered seven times during the rendering of an image, the corresponding indicator in storage 374 may have a seven (e.g., binary "111") stored therein. Alternatively, an area in which data was considered only once may have a corresponding indicator of one stored in storage 374. In this or an otherwise similar manner, the graphics unit 330 tracks the amount of data considered in rendering each subset area of an image. Based upon the tracked data (the stored indicators in this example), the prediction unit 370 may make predictions as to the likelihood that data for a particular subset area will be accessed more than once in the rendering of a subsequent image. Data which is predicted to be accessed again (i.e., the data is deemed "cacheable") may then be stored in the shared cache 340 if evicted from the graphics unit local cache 332 during the rendering of an image.

In one embodiment, prediction unit 370 may be configured to indicate data corresponding to a particular subset area "cacheable" if during the rendering of an image the corresponding pixel data is accessed more than a given number of times. For example, prediction unit 370 may be configured (e.g., via configuration registers 372) with a threshold, or "trigger", value. If data for a subset area is considered a number of times that exceeds this threshold value, prediction unit 370 may indicate the subset area corresponds to cacheable data. The indication that a particular subset area corresponds to cacheable or non-cacheable data may be as simple as a single bit. Numerous other ways of providing such an indication are possible and are contemplated.

Figure 4:
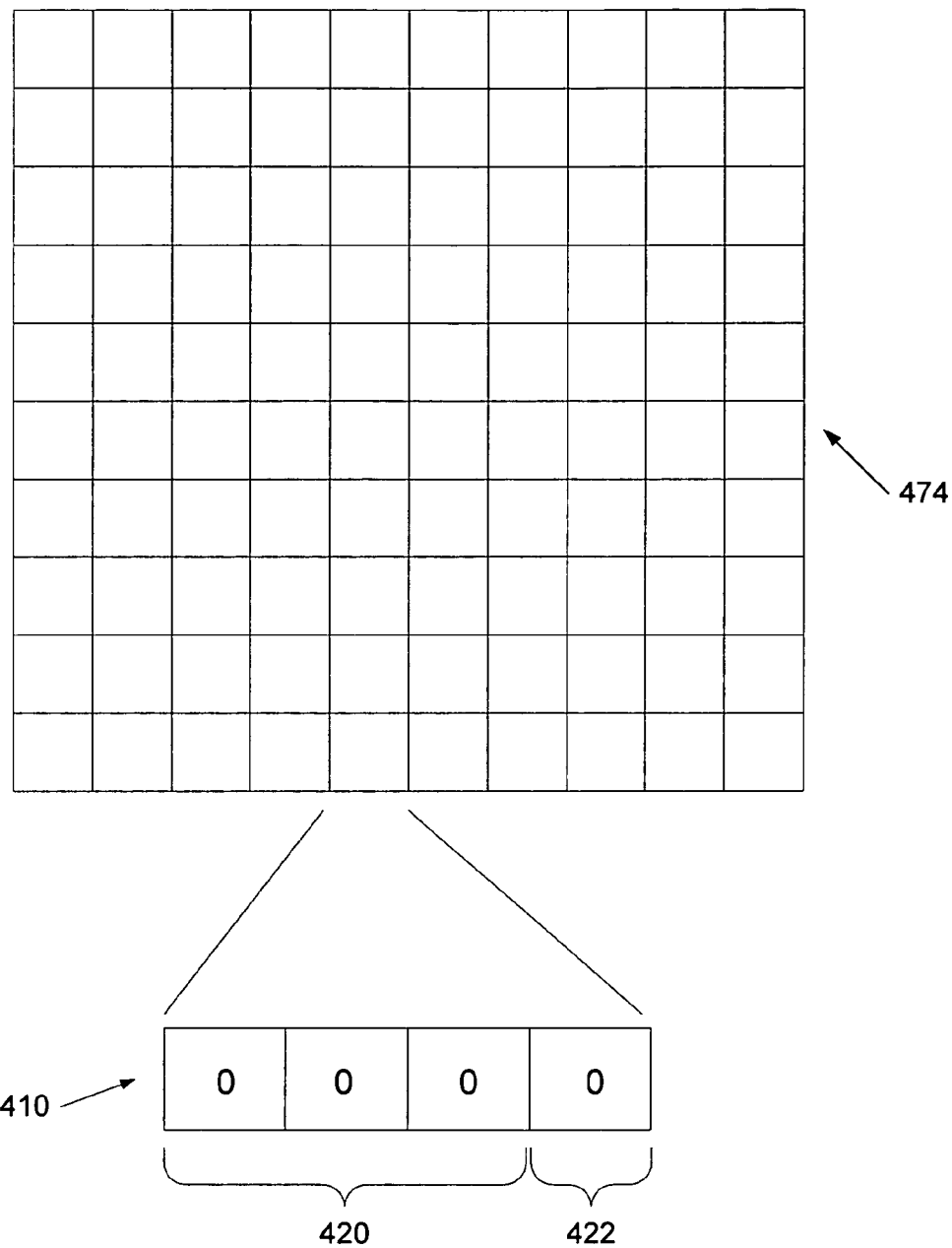
FIG. 4 illustrates one embodiment of a prediction entry.

FIG. 4 illustrates one of many possible embodiments of prediction data which may be stored in prediction data storage 374. In the example shown, data entries corresponding to the subset areas 474 of an image are shown. One of the data entries is shown in exploded view 410. Entry 410 is divided into two parts. A first part 420 includes a count represented by three bits. The second part 422 includes a prediction flag represented by a single bit.

In one embodiment, the count 420 for each of the stored entries is reset to zero prior to rendering an image. During the rendering of an image, a corresponding entry count is incremented each time pixel data corresponding to the subset area is considered. If after an image has been completely rendered the count stored in a particular entry exceeds a given threshold value, the prediction flag 422 for that entry is set to indicate that data for the corresponding subset area is cacheable. If after an image has been completely rendered the count stored in a particular entry does not exceed a given threshold value, the prediction flag 422 for that entry may be reset to indicate that data for the corresponding subset area is not cacheable. During the rendering of a subsequent image, the prediction flags 422 may then be used to indicate which data may be cached in a shared cache if evicted.

In an alternative embodiment, rather than using a separate prediction flag 422 as described above, the count itself may be used to indicate whether or not a particular subset area is cacheable. In such an embodiment, one or more bits of a count may be stored and used to indicate whether a subset area is cacheable. For example, the entire count could be stored and then subsequently compared to a threshold or trigger level to determine whether or not the corresponding area is cacheable. Alternatively, the most significant bit of a count could be stored and used to indicate whether an area is cacheable. Those skilled in the art will appreciate a number of such approaches are possible and all such alternative approaches are contemplated.

Generally speaking, pixel data for a given subset area may be "considered" if a read of the data by the graphics unit 330 is performed or if data is created by the graphics unit 330. It is noted that the data being read may be present within the graphics unit 330, the shared cache 340, or main memory 360. In one embodiment, reads by the graphics unit 330 are performed on a cache line basis. In such an embodiment, all pixel data within a given cache line which is read may be deemed "considered" for purposes of incrementing a corresponding count in the prediction data storage 374. Consequently, if the read unit (i.e., the cache line in this case) is larger than a subset area, more than one subset area may be deemed considered upon a read. Alternative architectures and embodiments may perform read accesses on other than a cache line basis and may deem data "considered" for purposes of rendering on a different basis as well.

As noted, various embodiments may utilize a particular threshold value to determine whether a subset area corresponds to cacheable or non-cacheable data. Such embodiments may enable the threshold value to be programmed into the graphics unit 330. In such a case the threshold may represent a hard value which must be met and/or exceeded to indicate cacheable data. Other embodiments may utilize relative values to determine whether a particular subset area corresponds to cacheable data. For example, subsequent to rendering an image, those subset areas with counts which are relatively high compared to the remaining counts are deemed cacheable. In such an embodiment there is no hard threshold per se. Rather, the "threshold" is determined based upon the count values in a given rendering. For example, prediction unit 370 may be configured to deem as cacheable those subset areas whose count falls within the top 10% of values for a given rendering. Of course, prediction unit 370 may be programmable to deem all subset areas as cacheable or none of the areas cacheable (effectively disabling the mechanism). Numerous such alternatives are possible and are contemplated.

Note that using relative values to determine cacheability as described above may result in a moving cacheability "threshold", or "trigger", value. Consequently, rather than being static, such a technique may be viewed as a type of dynamic approach. Other techniques for determining or adjusting cacheability may be utilized as well. In one embodiment, the threshold or trigger value for cacheability of graphics data may be adjusted based upon the cache miss rate for CPU data. For example, the CPU miss rate may be monitored during the preparation of a scene (e.g., scene N) and the resulting information used to set the cacheability trigger level for a subsequent scene (e.g., scene N+1). Alternatively, a moving average of the CPU miss rate may be maintained and used to update the cacheability threshold or trigger level. If the CPU miss rate rises higher than desired, the graphics data cacheability trigger level may be raised to reduce the amount of graphics data being cached.

Figure 5:
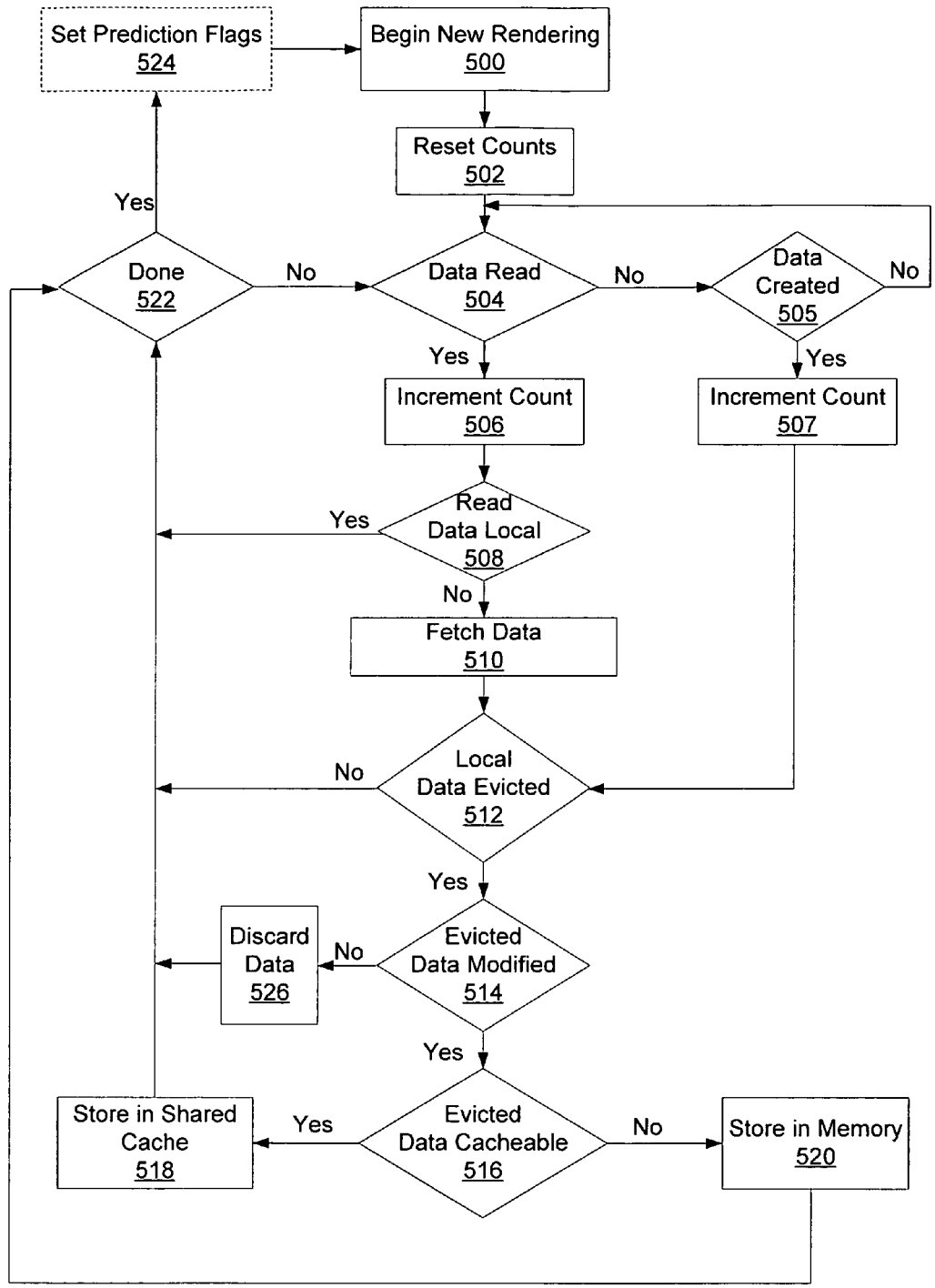
FIG. 5 illustrates one embodiment of a method for managing graphics data.

Turning now to FIG. 5, one embodiment of a method according the foregoing description is shown. When a new image is rendered (block 500), the counts for each of the subset areas are reset (block 502). If data is created or a data read occurs (decision blocks 504 and 505), the subset area count(s) corresponding to the created or read data are incremented (blocks 506 or 507) to indicate the corresponding data is being considered for the present rendering. If read data is locally present in the graphics unit cache/buffer (decision block 508), then processing continues to decision block 522. If the read data is not locally present in the graphics unit (decision block 508), the data is fetched (block 510). Fetched data may be returned from the shared cache if present there, or from memory if not in the shared cache.

Upon receiving the fetched data, a determination is made as to whether it is necessary to evict local data in order to store the fetched data (decision block 512). If local data is to be evicted (decision block 512), and the data to be evicted is not modified (decision block 514), the evicted data may simply be discarded (block 526). On the other hand, if the evicted data is modified (decision block 514), the prediction flag corresponding to the evicted data may be checked to determine whether or not the evicted data may be cached in the shared cache (decision block 516). If the evicted data is cacheable (decision block 516), the evicted data is stored in the shared cache (block 518). If the evicted data is not cacheable (decision block 516), the evicted data is not store in the shared cache and is stored in memory (block 520). While the rendering of the image is not done (decision block 522), the process continually monitors for reads (decision block 504). When the rendering of the image is complete (decision block 522), the graphics unit stores an indication (block 524) for each of the subset areas to indicate whether or not the area is cacheable. Alternatively, the count (or some portion thereof) may serve to indicate whether a subset area is cacheable. As described above, various embodiments may set a prediction flag based upon a hard threshold, or may set flags based upon relative count values.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a processor;
   a graphics unit comprising a graphics unit cache configured to store graphics data;
   a memory coupled to the processor and the graphics unit, wherein the memory is configured to store processor data and graphics unit data; and
   a shared cache coupled to the processor, the graphics unit, and the memory, wherein the shared cache is configured to store processor data and graphics unit data;
   wherein the graphics unit is configured to:
      partition images to be rendered into a plurality of subset areas;
      track the number of times data corresponding to each of the subset areas is considered during the rendering of a first image; and
      determine for each of the subset areas whether data corresponding to a subset area is cacheable;
   wherein the graphics unit includes a plurality of entries, each entry corresponding to one of the subset areas and including an indicator which indicates whether the corresponding subset area is cacheable in the shared cache;
   wherein during the rendering of a second image, the graphics unit is further configured to store data evicted from the graphics unit cache in the shared cache only if an indicator in an entry which corresponds to the data evicted from the graphics unit cache indicates the data evicted from the graphics unit cache is cacheable in the shared cache, said indicator being set prior to initiating the rendering of the second image.

2. The apparatus as recited in claim 1, wherein data corresponding to a subset area is determined to be cacheable if the number of times data corresponding to the subset area was considered during the rendering of the first image exceeds a threshold.

3. The apparatus as recited in claim 1, wherein data corresponding to a subset area is determined to be cacheable if the number of times data corresponding to the subset area was considered during the rendering of the first image was high relative to other subset areas of the image.

4. The apparatus as recited in claim 2, wherein each entry includes a count indicative of a number of times data corresponding to the subset area is considered during the rendering of an image.

5. The apparatus as recited in claim 4, wherein the graphics unit is further configured to:
   reset the count values for each of the subset area entries prior to rendering a new image; and
   increment an entry count in response to considering data corresponding to said subset area entry.

6. The apparatus as recited in claim 4, wherein the count is indicative of whether or not the corresponding subset area data is cacheable.

7. The apparatus as recited in claim 4, wherein the entry for each of the subset areas further includes a flag indicative of whether or not the corresponding subset area data is cacheable.

8. The apparatus as recited in claim 2, wherein the threshold is programmable.

9. The apparatus as recited in claim 2, wherein the value of the threshold is responsive in part to the processor data miss rate in the shared cache.

10. A method for managing graphics data, said method comprising:
   partitioning a first image to be rendered into a plurality of subset areas;
   storing a count corresponding to a first entry of a plurality of entries in response to considering graphics data corresponding to a subset area which corresponds to said first entry;
   providing an indication corresponding to said first entry subsequent to rendering said first image, wherein said indication indicates whether or not data corresponding to a subset area which corresponds to said first entry is cacheable in a shared cache;
   maintaining a plurality of entries, each entry corresponding to one of the subset areas and including an indication which indicates whether the corresponding subset area is cacheable in the shared cache;
   determining graphics data is to be evicted from a local cache;
   storing evicted data in the shared cache, in response to detecting an indication in an entry corresponding to said evicted data indicates said evicted data is cacheable in the shared cache; and
   storing the evicted data in a memory without storing the evicted data in the shared cache, in response to detecting the indication indicates the evicted data is not cacheable in the shared cache;
   wherein said shared cache is shared by a graphics unit and a processor.

11. The method as recited in claim 10, wherein said indication indicates said first entry is cacheable if the count corresponding to the subset area exceeds a threshold.

12. The method as recited in claim 10, wherein said indication indicates the subset area which corresponds to said first entry is cacheable if the count corresponding to the subset area is high relative to counts corresponding to the remaining subset areas of said plurality of subset areas.

13. The method as recited in claim 10, further comprising resetting a count corresponding to each of said entries prior to rendering a new image.

14. The method as recited in claim 13, wherein said count is utilized in determining whether corresponding data is cacheable during the rendering of a second image.

15. The method as recited in claim 11, wherein said threshold is programmable.

16. The method as recited in claim 12, further comprising adjusting said threshold in response to a miss rate of processor data in the shared cache.

17. A graphics unit comprising:
   a rendering unit;
   a local cache configured to store graphics data; and
   a prediction unit, wherein the prediction unit is configured to:
   partition images to be rendered into a plurality of subset areas;
      track the number of times data corresponding to each of the subset areas is considered during the rendering of a first image; and
      determine for each of the subset areas whether the corresponding subset area data is cacheable in a shared cache;
   wherein the graphics unit includes a plurality of entries, each entry corresponding to one of the subset areas and including an indicator which indicates whether the corresponding subset area is cacheable in the shared cache;
   wherein during the rendering of a second image, the graphics unit is further configured to store data evicted from the graphics unit cache in the shared cache only if an indicator in an entry which corresponds to the data evicted from the graphics unit cache indicates the data evicted from the graphics unit cache is cacheable in the shared cache, said indicator being set prior to initiating the rendering of the second image.

18. The graphics unit as recited in claim 17, wherein the prediction unit is configured to indicate a corresponding subset area is cacheable if the number of times data corresponding to the subset area was considered during the rendering of the first image exceeds a threshold.

19. The graphics unit as recited in claim 17, wherein the prediction unit is configured to indicate a corresponding subset area is cacheable if the number of times data corresponding to the subset area was considered during the rendering of the first image was high relative to other subset areas of the image.

20. The graphics unit as recited in claim 18, wherein each entry includes:
   a count indicative of a number of times data corresponding to the subset area is considered during the rendering of an image.

21. The graphics unit as recited in claim 20, wherein the prediction unit is further configured to:
   reset the count values for each of the subset area entries prior to rendering a new image; and
   increment an entry count in response to performing a read of data corresponding to said subset area entry.

22. The graphics unit as recited in claim 18, wherein the threshold is programmable.

23. The graphics unit as recited in claim 17, wherein the threshold is adjusted in response to a miss rate of processor data in the shared cache.

* * * * *